United States Patent
Pan

(10) Patent No.: US 8,561,496 B2
(45) Date of Patent: Oct. 22, 2013

(54) MULTI-AXIS INDUSTRIAL ROBOT WITH STOPPER

(75) Inventor: Xiao-Peng Pan, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 268 days.

(21) Appl. No.: 12/952,410

(22) Filed: Nov. 23, 2010

(65) Prior Publication Data

US 2011/0290059 A1 Dec. 1, 2011

(30) Foreign Application Priority Data

May 28, 2010 (CN) .......................... 2010 1 0186079

(51) Int. Cl.
*B25J 17/00* (2006.01)
*B25J 17/02* (2006.01)
*B25J 18/00* (2006.01)

(52) U.S. Cl.
USPC ................... 74/490.05; 74/490.01; 901/11

(58) Field of Classification Search
USPC ......... 74/490.01, 490.05, 490.06; 901/11, 12, 901/13
See application file for complete search history.

(56) References Cited

U.S. PATENT DOCUMENTS

| | | | | |
|---|---|---|---|---|
| 4,279,560 A | * | 7/1981 | Ito et al. .......................... | 414/589 |
| 5,193,658 A | * | 3/1993 | Tellden .......................... | 192/138 |
| 5,558,196 A | * | 9/1996 | Nihei et al. ............... | 192/142 R |
| 6,065,364 A | * | 5/2000 | Shiraki et al. ............... | 74/490.01 |
| 7,086,822 B2 | * | 8/2006 | Maeda ........................ | 414/744.5 |
| 2011/0290059 A1 | * | 12/2011 | Pan ............................ | 74/490.01 |

FOREIGN PATENT DOCUMENTS

JP  04019088 A * 1/1992

* cited by examiner

*Primary Examiner* — David M Fenstermacher
*Assistant Examiner* — Jake Cook
(74) *Attorney, Agent, or Firm* — Altis Law Group, Inc.

(57) ABSTRACT

An industrial robot includes a mounting base, a turning base rotatable relative to the mounting base about a rotation axis, and a stopper mechanically limiting an operating angle of the turning base. The stopper includes a fixed section attached to the mounting base, a connecting base attached to the turning base, and a swing lever pivotally connected to the connecting base and capable of swinging between a first position and a second position. The turning base is maintained in the first position and the second position, respectively, by the stopper when the swing lever contacts the fixed section, thereby limiting the operating angle of the turning base.

15 Claims, 5 Drawing Sheets

MULTI-AXIS INDUSTRIAL ROBOT WITH STOPPER

BACKGROUND

1. Technical Field

The present disclosure relates to industrial robots, and more particularly, to a multi-axis industrial robot.

2. Description of the Related Art

A commonly used multi-axis industrial robot includes a mounting base, a turning base rotating around an axis over the mounting base, and a plurality of links and joints. A stopper attached to the mounting base and the turning base mechanically limits the operating angle of the turning base when the rotation angle reaches a preset limit. Generally, the stopper includes a first fixed section attached to the mounting base, and a second fixed section attached to the turning base. When the turning base is rotated through a predetermined operating angle, the second fixed section collides with the first fixed section, thereby mechanically hindering the rotation of the turning base. However, the limit of the operating angle of the turning angle cannot be set to a value in the vicinity of or beyond 360°. As a matter of course, elimination of the stopper altogether can also be adopted. However, to protect a drive cable or the like of the industrial robot connected between the mounting base and the turning base, the operating angle of the turning base must be mechanically limited.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

Figure 1:
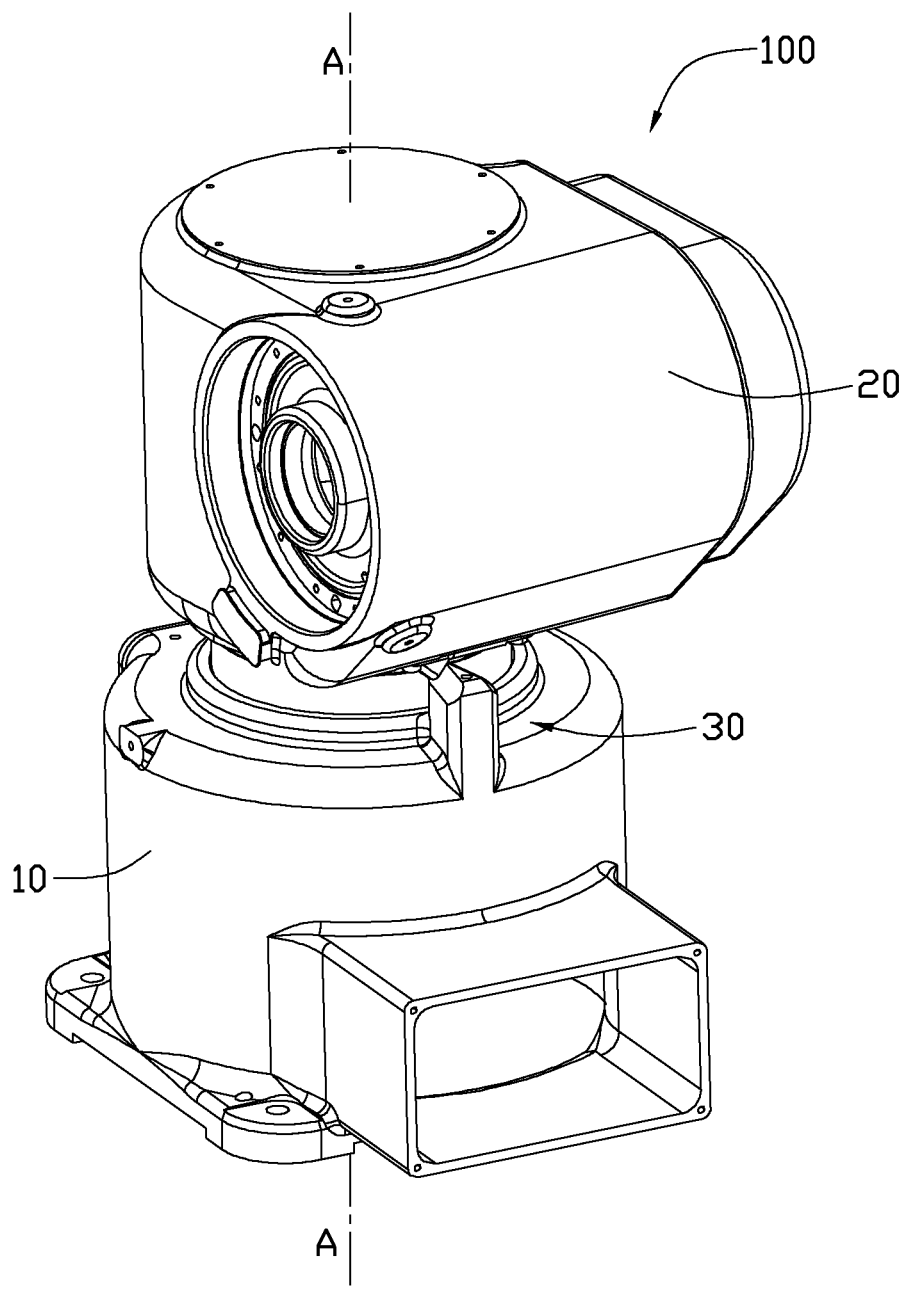
FIG. 1 is a partial, assembled, isometric view of an embodiment of an industrial robot in a first position and provided with a stopper including a connecting base and a swing lever.

Referring to FIG. 1, one embodiment of an industrial robot 100 includes a mounting base 10, a turning base 20 rotatable relative to the mounting base 10, and a stopper 30 to mechanically limit an operating angle of the turning base 20. The industrial robot 100 can be a six-axis robot. Other components of the industrial robot 100, such as one or more joints, one or more electric motors, and drive cables or the like are not shown.

Figure 2:
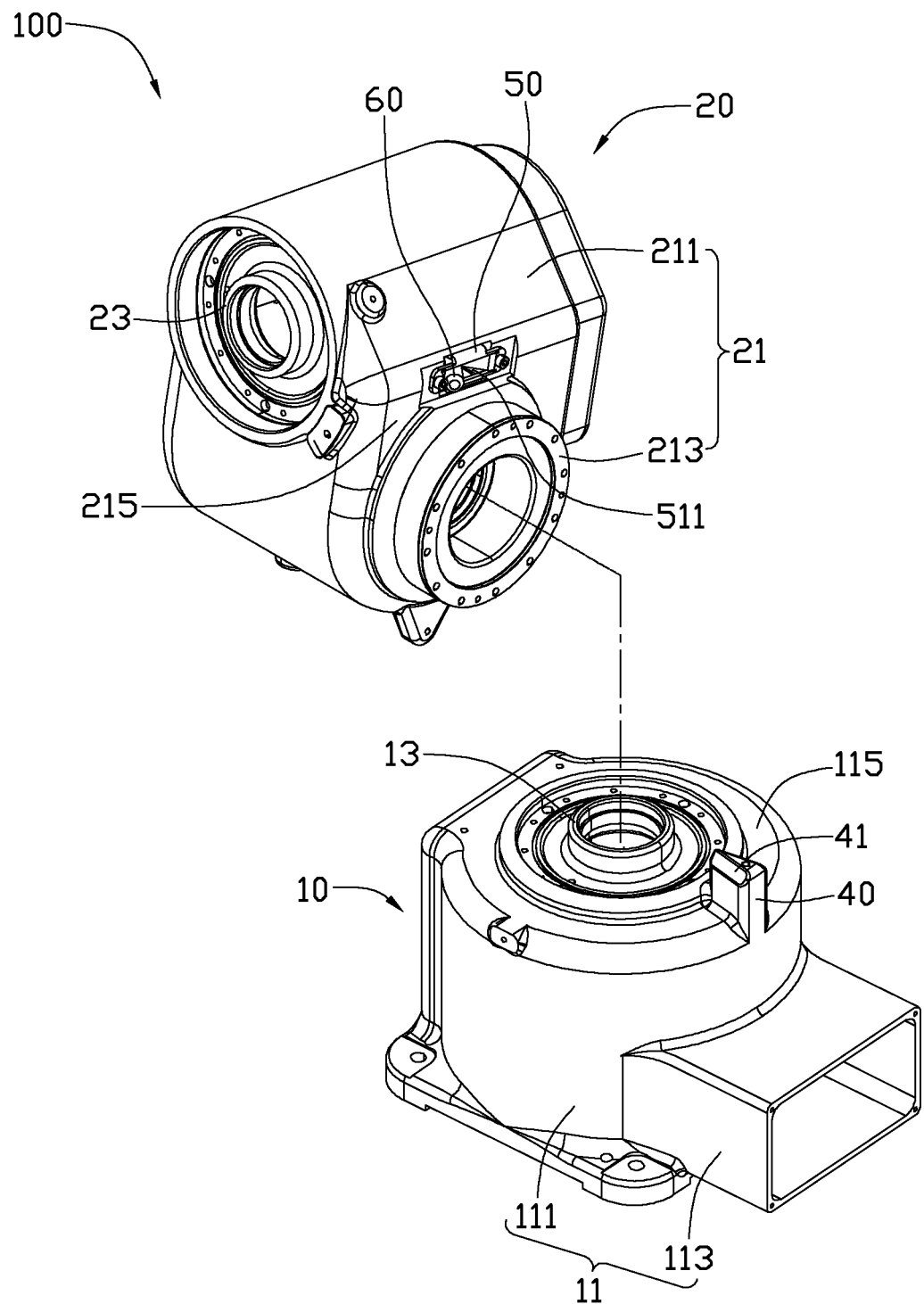
FIG. 2 is a partially exploded, isometric view of the industrial robot of FIG. 1.

Referring to FIG. 2, the mounting base 10 includes a first housing 11 and a first rotation shaft 13 received in the first housing 11. The first housing 11 can be formed by casting, and includes a main body 111 and a cable inlet 113 formed on a side of the main body 111. The main body 111 is substantially cylindrical, includes a first mounting surface 115 around the first rotation shaft 13, and faces the turning base 20.

The turning base 20 can be formed by casting, and includes a second housing 21 and a second rotation shaft 23 received in the second housing 21. The second housing 21 includes a main body 211 and a connecting portion 213 formed on a side of the main body 211. The main body 211 includes a second mounting surface 215 opposite to the first mounting surface 115. The connecting portion 213 is fixed to the first rotation shaft 13 of the mounting base 10, so that the turning base 20 can rotate around a rotation axis A-A over the mounting base 10 when the turning base 20 is rotated by the first rotation shaft 13.

The stopper 30 includes a fixed section 40 protruding from the first mounting surface 115, a connecting base 50 mounted on the second mounting surface 215 and adjacent to the connecting portion 213, and a swing lever 60 pivotally connected to the connecting base 50.

In the illustrated embodiment, the cross section of the fixed section 40 perpendicular to the rotation axis A-A is substantially sector-shaped or fan-shaped, and the width of the sector-shaped cross section of the fixed section 40 gradually increases away from the rotation axis A-A. The height of the fixed section 40 is less than the gap between the first mounting surface 115 and the second mounting surface 215. The fixed section 40 forms two opposite engagement surfaces 41 at the top thereof. The engagement surfaces 41 are inclined toward the rotation axis A-A. The engagement surfaces 41 can be formed by trimming.

Figure 3:
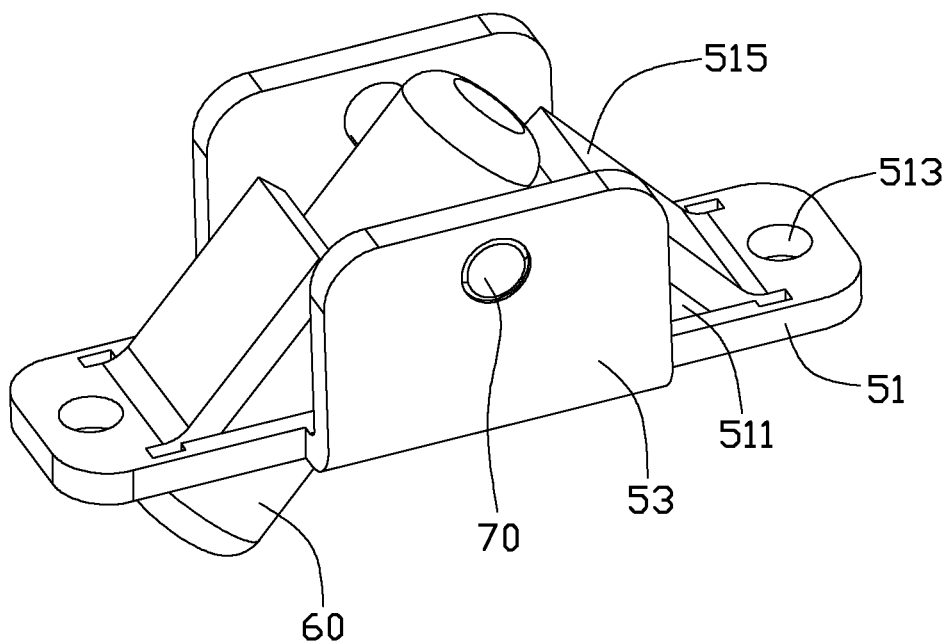
FIG. 3 is an assembled, isometric view of the connecting base and the swing lever in FIG. 2.
Figure 4:
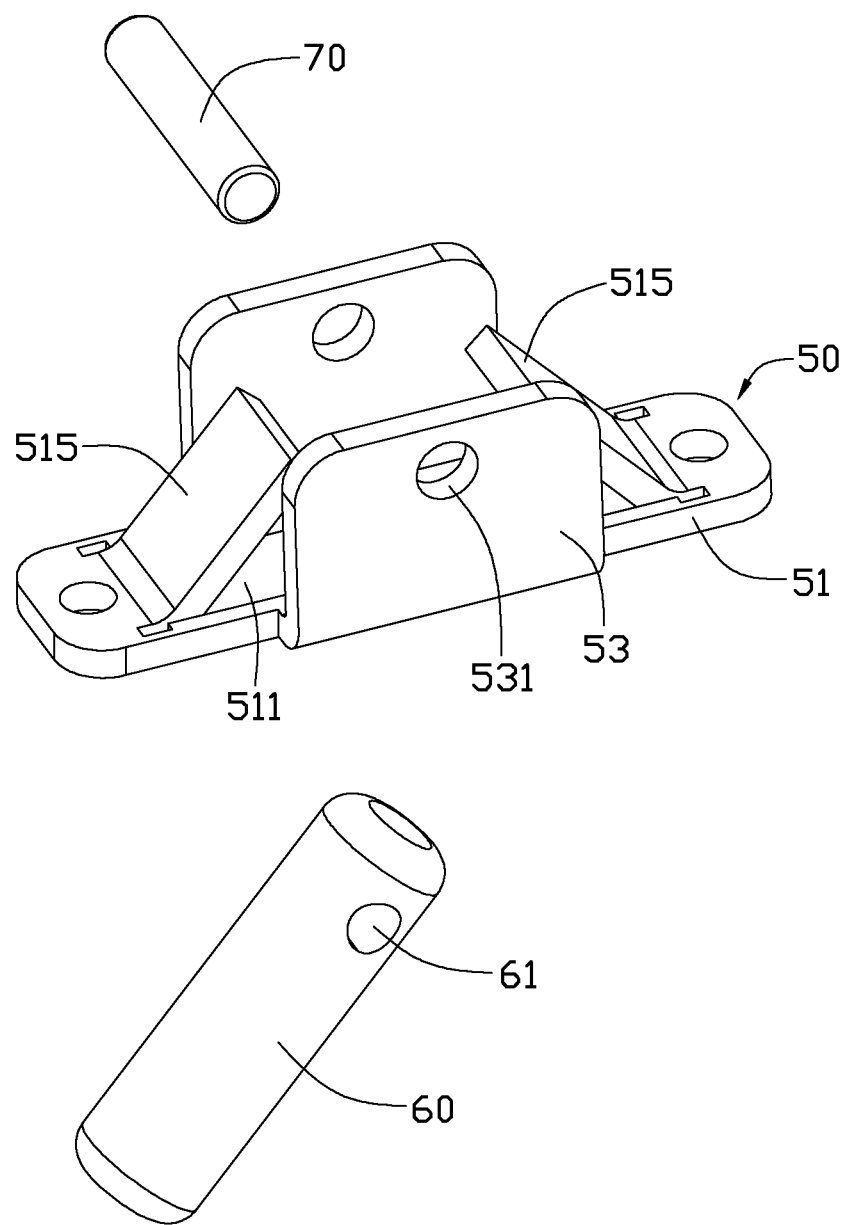
FIG. 4 is an exploded, isometric view of the connecting base and the swing lever of FIG. 3.

Referring to FIGS. 3 and 4, the connecting base 50 includes a bottom wall 51 and two side walls 53 substantially perpendicular to the bottom wall 51. The bottom wall 51 defines a limit hole 511 for receiving the swing lever 60. The limit hole 511 is substantially rectangular, and is located in the middle portion of the bottom wall 51. The bottom wall 51 further defines two mounting holes 513 on opposite ends thereof. The side walls 53 define two aligned shaft holes 531.

The swing lever 60 is substantially cylindrical and defines a through hole 61 adjacent to an end thereof and extending radially. The stopper 30 further includes a retaining shaft 70. The swing lever 60 is pivotally connected to the connecting base 50 in such a manner that the retaining shaft 70 is received in the through hole 61 and the shaft holes 531. The end of the swing lever 60 away from the through hole 61 is received in the limit hole 511, such that the swing lever 60 is capable of swinging in the limit hole 511. The connecting base 50 further forms two opposite stopper plates 515 at a predetermined angle and extending upward and toward the shaft holes 531. The included angle formed between the two stopper plates 515 is in the range from 84° to 96°. The swing lever 60 is rotatably positioned between the two stopper plates 515. The rotation angle range of the swing lever 60 exceeds or equals to the angle between the two stopper plates 515.

Referring to FIG. 2 again, the second mounting surface 215 of the turning base 20 defines a groove (not labeled) to receive the connecting base 50 and a plurality of fasteners (not shown) received in the mounting holes 513.

Figure 5:
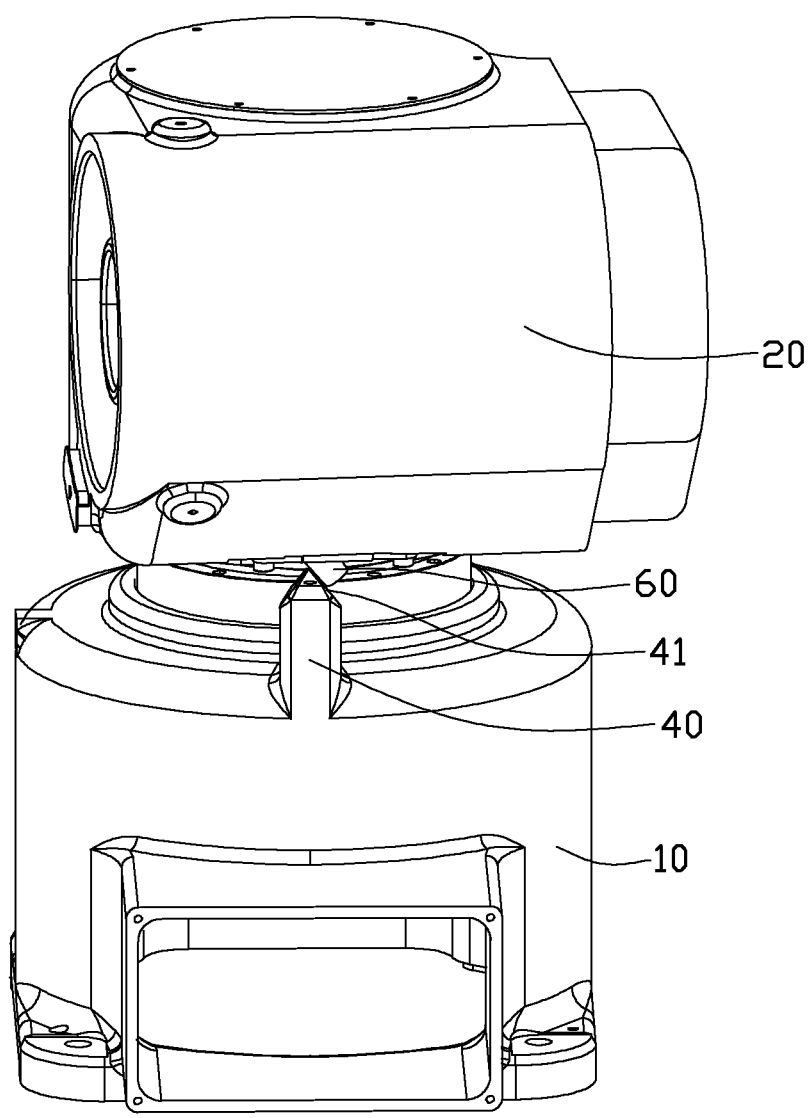
FIG. 5 is a partial, assembled, isometric view of the embodiment of the industrial robot in a second position.

By reference to FIGS. 1 and 5, the operation of the stopper 30 are as follows. When the turning base 20 turns counterclockwise about the rotation axis A-A through a given angle, the swing lever 60 comes into contact with one engagement surface 41 of the fixed section 40. The swing lever 60 swings around the retaining shaft 70 until it comes into contact with the stopper plate 515 and the engagement surface 41, thereby maintaining the turning base 20 in the first position as illustrated in FIG. 1. As the swing lever 60 swings about the retaining shaft 70, the limit of the operating angle of the turning base 20 can be set to a value of about 360° or more. When the turning base 20 turns clockwise about the rotation axis A-A through a given angle, the swing lever 60 comes into contact with another stopper plate 515 and the corresponding engagement surface 41, such that the turning base 20 is maintained in the second position as illustrated in FIG. 5.

In other embodiments, the industrial robot 100 further includes an electric motor (not shown) to drive the first rotation shaft 13, and an alarm module (not shown). The alarm module is configured to generate a plurality of alarm signals and deactivate the electric motor when the swing lever 60 contacts the fixed section 40, thus preventing damage to the industrial robot 100.

It should be understood that the rotation angle range of the turning base 20 relative to the mounting base 10 can be adjusted by adjusting the included angle between the two stopper plates 515 and the engagement surfaces 41 of the fixed section 40, respectively. Because the largest rotation angle of the turning base 20 can be limited by the stopper 30 and can exceed 360°, the drive cables or the like can be prevented from being damaged by twining and twisting.

It is believed that the present embodiments and their advantages will be understood from the foregoing description, and it will be apparent that various changes may be made thereto without departing from the spirit and scope of the embodiments or sacrificing all of its material advantages, the examples hereinbefore descried merely being preferred or exemplary embodiments.

What is claimed is:

1. An industrial robot comprising:
   a mounting base;
   a turning base rotatable relative to the mounting base about a rotation axis; and
   a stopper mechanically limiting an operating angle of the turning base, the stopper comprising:
   a fixed section attached to the mounting base, wherein the cross section of the fixed section perpendicular to the rotation axis of the turning base is substantially sector-shaped;
   a connecting base attached to the turning base, the connecting base comprising a bottom wall and two side walls substantially perpendicular to the bottom wall, wherein each of the two side walls defines a shaft hole, and two shaft holes of the two sidewalls are aligned; and
   a swing lever pivotally connected to the connecting base and capable of swinging between a first position and a second position, wherein the swing lever defines a through hole extending radially, and the stopper further comprises a retaining shaft received in the through hole and the two shaft holes of the two side walls, the bottom wall defines a limit hole for receiving the swing lever, and the turning base is maintained in the first position and the second position, respectively, by the stopper when the swing lever contacts the fixed section, thereby limiting the operating angle of the turning base.

2. The industrial robot of claim 1, wherein the operating angle of the turning base exceeds 360°.

3. The industrial robot of claim 1, wherein the operating angle of the turning base exceeds 360° and is less than about 380°.

4. The industrial robot of claim 1, wherein the mounting base comprises a first mounting surface oriented towards the turning base, and the fixed section protrudes from the first mounting surface; the turning base comprises a second mounting surface oriented towards the first mounting surface, and the connecting base is mounted on the second mounting surface.

5. The industrial robot of claim 1, wherein the width of the sector-shaped cross section of the fixed section gradually increases away from the rotation axis of the turning base.

6. The industrial robot of claim 1, wherein the fixed section comprises two opposite engagement surfaces at the top thereof to engage with the swing lever, and the engagement surfaces are inclined toward the rotation axis of the turning base.

7. The industrial robot of claim 1, wherein the limit hole is substantially rectangular, and is located in a middle portion of the bottom wall.

8. The industrial robot of claim 1, wherein the connecting base further comprises two opposite stopper plates inclined to the bottom wall and extending upward and toward the shaft holes, the stopper plates engage the swing lever to hinder the turning base when the swing lever is in the first position and the second position, respectively.

9. The industrial robot of claim 8, wherein the angle between the two stopper plates is in the range from 84° to 96°.

10. The industrial robot of claim 8, wherein the rotation angle range of the swing lever exceeds or equals to the angle between the two stopper plates.

11. The industrial robot of claim 4, wherein the second mounting surface of the turning base defines a groove to receive the connecting base and at least one fastener for fixing the connecting base to the turning base.

12. The industrial robot of claim 1, further comprising an electric motor to drive the turning base, and an alarm module configured to generate a plurality of alarm signals and deactivate the electric motor when the swing lever engages the fixed section.

13. An industrial robot comprising:
   a mounting base;
   a turning base rotatable relative to the mounting base about a rotation axis; and
   a stopper mechanically limiting an operating angle of the turning base, the stopper comprising:
   a fixed section protruding from the mounting base and forming two opposite engagement surfaces, wherein the cross section of the fixed section perpendicular to the rotation axis of the turning base is substantially sector-shaped;
   a connecting base mounted on the turning base, the connecting base comprising a bottom wall and two side walls substantially perpendicular to the bottom wall, wherein each of the two side walls defines a shaft hole, two shaft holes of the two side walls are aligned, and the connecting base forms two stopper plates at a predetermined angle; and
   a swing lever pivotally connected to the connecting base and capable of swinging between the two stopper plates; wherein the swing lever defines a through hole extending radially, and the stopper further comprises a retaining shaft received in the through hole and the two shaft holes of the two side walls, the bottom wall defines a limit hole for receiving the swing lever, and the turning base is maintained in the first position and the second position, respectively, when the swing lever contacts one of the stopper plates and the corresponding engagement surface, thereby setting a preset limit of the operating angle of the turning base to a value of about 360° or above 360°.

14. The industrial robot of claim 13, wherein the limit hole is substantially rectangular, and is located in a middle portion of the bottom wall.

15. The industrial robot of claim 13, wherein the rotation angle range of the swing lever exceeds or equals to the angle between the two stopper plates.

* * * * *